(12) United States Patent
Koda et al.

(10) Patent No.: US 6,863,998 B2
(45) Date of Patent: Mar. 8, 2005

(54) MAGNETIC RECORDING MEDIUM, METHOD FOR PRODUCING THE SAME, AND MAGNETIC RECORDING APPARATUS

(75) Inventors: Tetsunori Koda, Moriya (JP); Nobuyuki Inaba, Hasuda (JP); Hideaki Yamanaka, Toride (JP); Enji Fujita, Matsudo (JP); Satoshi Matsunuma, Kamakura (JP)

(73) Assignee: Hitachi Maxell, Ltd., Osaka (JP)

(*) Notice: Subject to any disclaimer, the term of this patent is extended or adjusted under 35 U.S.C. 154(b) by 0 days.

(21) Appl. No.: 10/307,301

(22) Filed: Dec. 2, 2002

(65) Prior Publication Data

US 2003/0118867 A1 Jun. 26, 2003

(30) Foreign Application Priority Data

Dec. 3, 2001 (JP) .................................. 2001-368485

(51) Int. Cl.[7] .............................. G11B 5/66; G11B 5/70
(52) U.S. Cl. .............................. 428/694 T; 428/694 TS; 428/694 TM; 428/900; 427/192.2
(58) Field of Search ................ 428/694 T, 694 TS, 428/694 TM, 900; 427/192.2, 192.12, 192.15

(56) References Cited

U.S. PATENT DOCUMENTS

| | | | | | |
|---|---|---|---|---|---|
| 6,033,536 | A | * | 3/2000 | Ichihara et al. | 204/192.2 |
| 6,555,252 | B2 | * | 4/2003 | Sellmyer et al. | 428/668 |
| 6,630,255 | B1 | * | 10/2003 | Litvinov et al. | 428/694 TM |

FOREIGN PATENT DOCUMENTS

| | | |
|---|---|---|
| JP | A 9-320847 | 12/1997 |
| JP | A 11-353648 | 12/1999 |
| JP | A 2001-056931 | 2/2001 |
| JP | A 2001-101645 | 4/2001 |
| JP | A 2001-176048 | 6/2001 |
| JP | A 2001-283419 | 10/2001 |
| JP | A 2002-123920 | 4/2002 |
| JP | A 2003-006830 | 1/2003 |

OTHER PUBLICATIONS

Hu et al., "Kerr Effect of Ordered and Disordered Fe1–xPtx(001) Alloy Films", Jul. 2001, IEEE Trans Magn, vol. 37, No. 4, pp. 2417–2419.*

International Preliminary Examination Report (IPER) from PCT/JP2002/012648.

Inaba et al.,"Effects of Pt and Ta addition on compositional microstructure of CoCr–alloy thin film media", Journal of Applied Physics, vol. 87, No. 9, pp. 6863–6865, 2000.

Chen et al., "Long–range atomic ordering and magnetic properties of $Co_{1-x}Pt_x/SiO_2$ granular films", Journal of Applied Physics, vol. 87, No. 9, pp. 6947–6949, 2000.

* cited by examiner

Primary Examiner—Holly Rickman
(74) Attorney, Agent, or Firm—Oliff & Berridge, PLC

(57) ABSTRACT

A magnetic recording medium 100 comprises, on a substrate 1, a first orientation control layer 2, a second orientation control layer 4, a soft magnetic layer 6, a non-magnetic layer 8, a recording layer 12, and a carbon protective layer 14. The recording layer 12 is formed of an FePt ordered alloy phase which exhibits ferromagnetism and an $FePt_3$ ordered alloy phase which exhibits paramagnetism. Accordingly, the magnetic coupling force, which acts between those of the FePt ordered alloy phase, is broken by the paramagnetic $FePt_3$ ordered alloy phase. The magnetic interaction between those of the FePt ordered alloy phase is reduced, and thus the noise is reduced. Further, the high density recording can be performed, and the medium is excellent in thermal stability, because the FePt ordered alloy having high crystalline magnetic anisotropy is used for the recording layer 12.

17 Claims, 2 Drawing Sheets

MAGNETIC RECORDING MEDIUM, METHOD FOR PRODUCING THE SAME, AND MAGNETIC RECORDING APPARATUS

BACKGROUND OF INVENTION

1. Field of Invention

The present invention relates to a magnetic recording medium and a magnetic recording apparatus. In particular, the present invention relates to a magnetic recording medium which is excellent in thermal stability and which is preferably usable for high density recording. The present invention also relates to a magnetic recording apparatus installed with the same.

2. Description of the Related Art

The multimedia, which makes it possible to process not only character information but also voice and image information at a high speed, comes into widespread use in accordance with the development of the advanced information society in recent years. A magnetic recording apparatus, which is installed to a computer or the like, is known as one of those related to the multimedia. At present, the development is advanced in order to realize the miniaturization while improving the recording density of the magnetic recording medium to be used for the magnetic recording apparatus.

A typical magnetic recording apparatus comprises a plurality of magnetic disks which are rotatably installed to a spindle. Each of the magnetic disks is composed of a substrate and a magnetic film formed thereon. Information is recorded by forming magnetic domains having specified magnetization directions in the magnetic film.

The in-plane magnetic recording system is adopted for the magnetic recording apparatus practically used at present. The in-plane magnetic recording system is based on the use of a magnetic recording medium which comprises, as a recording layer, a magnetic layer having an easy axis of magnetization in a direction parallel to the disk surface so that magnetic domains having in-plane magnetization are formed in the recording layer to perform the recording. In contrast to the recording system as described above, the perpendicular magnetic recording system has been suggested as a recording system to realize high density recording on a magnetic recording medium. The perpendicular magnetic recording system is based on the use of the magnetic recording medium which has perpendicular magnetic anisotropy so that magnetic domains having perpendicular magnetization are formed in a recording layer to perform the magnetic recording.

In any one of the recording systems, in general, a Co—Cr-based alloy is used for the recording layer of the magnetic recording medium. Owing to the effect of the added element, the Co—Cr-based alloy undergoes the phase separation into two types of phases, i.e., a ferromagnetic phase in which the Cr concentration is low and a non-magnetic phase in which the Cr concentration is high. Therefore, the Co—Cr-based alloy makes it possible to reduce the magnetic interaction between crystal grains (N. Inaba et al., J. Appl. Phys. 87, 6863 (2000)). That is, in the Co—Cr-based alloy, the magnetic coupling, which would be effected between the crystal grains, is broken by the non-magnetic layer in which the Cr concentration is high. Therefore, the crystal grains are magnetically isolated from each other in the Co—Cr-based alloy. Accordingly, any zigzag domain wall, which would cause the medium noise, is not formed at the bit boundary, i.e., at the portion of the magnetization transition area. Thus, the reduction of the medium noise is realized.

Although the Co—Cr-based alloy has the advantage as described above, it involves such a problem that the crystalline magnetic anisotropy is small, i.e., about $2\times10^6$ erg/$cm^3$. For example, the Co—Cr-based alloy has had the following problem. That is, when the magnetic grains of the Co—Cr-based alloy for forming the recording layer are made fine and minute in order to realize a higher recording density with the magnetic recording apparatus, the thermal stability of the magnetic grains is degraded, because the magnetization reversal volume is decreased. In order to solve the problem of the thermal stability as described above, a method has been suggested, in which a material having crystalline magnetic anisotropy larger than that of the Co—Cr-based alloy is used for the material for forming the recording layer. Those known as the material having the large crystalline magnetic anisotropy include $L1_0$ ordered alloys such as FePt, CoPt, and FePd. The crystalline magnetic anisotropy constant of the $L1_0$ ordered alloy as described above is 1.8 to $10\times10^7$ erg/$cm^3$ which is larger than that of the Co—Cr-based alloy by not less than one digit. Therefore, it is possible to expect high thermal stability even when the magnetic grains are made fine and minute.

However, when the $L1_0$ ordered alloy is simply used to form a recording layer, it has been unsuccessful to obtain any two-phase separation structure composed of the magnetic phase and the non-magnetic phase, unlike the Co—Cr-based alloy. Therefore, the following problem has arisen. That is, the magnetic interaction between the crystal grains is not broken any longer. A plurality of crystal grains undergo the magnetization reversal in bulk when a recording magnetic field is applied with a magnetic head. As a result, the noise is increased when the reproduction is performed. Therefore, when the $L1_0$ ordered alloy is used as a recording layer, it has been demanded to form a structure in which the magnetic interaction between crystal grains is reduced in the same manner as in the Co—Cr-based alloy.

In order to respond to this demand, for example, an attempt has been made to use a method in which a structure similar to that of the Co—Cr-based alloy is formed by dispersing an $L1_0$ ordered alloy in a base phase of oxide. However, this method has involved such a problem that it is difficult to control the orientation of the recording layer. Further, the ordering temperature of the $L1_0$ ordered alloy, which is required when the $L1_0$ ordered alloy is dispersed in the base phase of oxide, is higher than that required when only the $L1_0$ ordered alloy is manufactured. Therefore, there has been such a problem that any glass substrate, which cannot endure the high temperature treatment, cannot be used as a substrate for the magnetic recording medium (C. Chen et al., J. Appl. Phys. 87, 6947–6949 (2000)).

SUMMARY OF THE INVENTION

The present invention has been made in order to solve the problems of the conventional technique as described above, an object of which is to provide a magnetic recording medium which makes it possible to reduce the noise even when an $L1_0$ ordered alloy having high crystalline magnetic anisotropy is used for a recording layer.

Another object of the present invention is to provide a magnetic recording apparatus which is excellent in thermal stability and in which the noise is reduced.

Still another object of the present invention is to provide a method for producing a magnetic recording medium comprising a recording layer including an $L1_0$ ordered alloy on a glass substrate.

According to a first aspect of the present invention, there is provided a magnetic recording medium comprising:

a substrate; and a recording layer which is formed on the substrate, wherein:

the recording layer includes an FePt ordered alloy and an $FePt_3$ ordered alloy.

The magnetic recording medium of the present invention includes the FePt ordered alloy and the $FePt_3$ ordered alloy in the recording layer which is formed on the substrate. In this structure, the recording layer resides in a mixed phase in which the two types of phases, i.e., the ferromagnetic FePt ordered alloy phase and the $FePt_3$ ordered alloy phase are separated from each other. In the mixed phase of the FePt ordered alloy phase and the $FePt_3$ ordered alloy phase as described above, it is considered that the ferromagnetic FePt ordered alloy phase constitutes the crystal grains, and the $FePt_3$ ordered alloy phase constitutes the crystal grain boundary. The $FePt_3$ ordered alloy phase exhibits the antiferromagnetism at a temperature of not more than −113° C., and it exhibits the paramagnetism at a temperature higher than the above. Therefore, when the magnetic recording medium of the present invention is incorporated into a magnetic recording apparatus, the $FePt_3$ ordered alloy phase in the recording layer exhibits the paramagnetism in the operation temperature region (0° C. to 100° C.) of the magnetic recording apparatus. Accordingly, it is considered that the magnetic interaction, which acts between the crystal grains of the ferromagnetic FePt ordered alloy phase, is broken by the paramagnetic $FePt_3$ ordered alloy phase. Therefore, even when the recording layer is based on the use of the FePt ordered alloy which has the high crystalline magnetic anisotropy, it is possible to reduce the noise, because the magnetic interaction between the crystal grains is broken. Further, the magnetic recording medium is excellent in thermal stability, because it is possible to use the FePt ordered alloy which has the high crystalline magnetic anisotropy. Other than the FePt ordered alloy, the recording layer may contain a ferromagnetic ordered alloy having high crystalline magnetic anisotropy, for example, an $L1_0$ ordered alloy such as CoPt and FePd.

In order that the magnetic interaction, which acts between the crystal grains for constructing the recording layer, is broken by the $FePt_3$ ordered alloy contained in the recording layer as described above, it is desirable that the crystal grain boundary is composed of the $FePt_3$ ordered alloy. For this purpose, it is preferable that the content of the $FePt_3$ ordered alloy contained in the recording layer is within a range of 15 atomic % to 60 atomic %. The reason thereof will be explained below. As described above, when the recording layer is constructed, it is important to provide the structure in which the crystal grains are surrounded by the $FePt_3$ ordered alloy. In the present circumstances, the crystal grain in the recording layer of the magnetic recording medium has a size of about 10 nm. In view of the realization of a high density, it is necessary to decrease the crystal grain diameter. However, if the crystal grain diameter is decreased, it is feared that the thermal stability of magnetization may be deteriorated. The higher the crystalline magnetic anisotropy is, the more stable the magnetization is. Therefore, the crystal grain diameter is determined taking the crystalline magnetic anisotropy into consideration. In the case of the FePt ordered alloy having high crystalline magnetic anisotropy, it is possible to decrease the crystal grain diameter to about 4 nm. Accordingly, it is assumed that the crystal grain, i.e., the grain of the FePt ordered alloy has a diametral size of 4 nm to 14 nm, and the crystal grain boundary around the crystal grain, i.e., the $FePt_3$ ordered alloy has a thickness of 1 nm to 2 nm. On this assumption, the content of the $FePt_3$ ordered alloy included in the recording layer is calculated to be 15 atomic % to 60 atomic %. The thickness of the crystal grain boundary around the crystal grain has been assumed to be 1 nm to 2 nm for the following reason. That is, the random phase of $FePt_3$ usually exhibits the ferromagnetism. Therefore, in order to break the magnetic interaction between the crystal grains, it is necessary to use $FePt_3$ in a paramagnetic region considering a case in which the random phase of $FePt_3$ is contained. When the thickness of the crystal grain boundary is not more than 2 nm, the paramagnetic region is reliably obtained. Therefore, it is possible to reliably break the magnetic interaction between the crystal grains. On the other hand, if the thickness is thinner than 1 nm, it is feared that the magnetic interaction between the crystal grains cannot be broken. In view of the above, the thickness of the crystal grain boundary has been assumed to be 1 nm to 2 nm.

The recording layer of the magnetic recording medium of the present invention includes the FePt ordered alloy and the $FePt_3$ ordered alloy. When the magnetic recording medium as described above is used as a medium based on the perpendicular magnetic recording system, the (001) plane of the FePt ordered alloy is oriented in parallel to the film surface so that the easy axis of magnetization of the FePt ordered alloy is arranged in the direction perpendicular to the film surface. The crystalline structure of the FePt ordered alloy resides in the face-centered tetragonal lattice (hereinafter referred to as "fct") having lattice constants of 3.8525 angstroms for the a axis and 3.7133 angstroms for the c axis. On the other hand, the crystalline structure of the $FePt_3$ ordered alloy resides in the face-centered cubic lattice (hereinafter referred to as "fcc") having a lattice constant of 3.866 angstroms. Therefore, the FePt ordered alloy and the $FePt_3$ ordered alloy are crystallographically compatible with each other, and they have the approximately identical lattice constants. Therefore, the $FePt_3$ ordered alloy does not inhibit the (001) preferred orientation of the FePt ordered alloy. Therefore, the orientation can be controlled with ease for the recording layer which is formed of the FePt ordered alloy and the $FePt_3$ ordered alloy.

It is preferable to use a glass substrate for the magnetic recording medium of the present invention in view of the mass production performance.

The magnetic recording medium of the present invention may further comprise an orientation control layer. The orientation control layer makes it possible to orient the easy axis of magnetization of the recording layer in the direction perpendicular to the film surface. Those usable as the material for constructing the orientation control layer may include, for example, elements such as Cr, Pt, Pd, Au, Fe, and Ni, compounds such as MgO and NiO, and alloys containing them. The orientation control layer may be composed of a single layer. Alternatively, the orientation control layer may be composed of a plurality of layers.

The magnetic recording medium of the present invention may further comprise a soft magnetic layer. It is preferable that the soft magnetic layer is positioned in the medium so that the recording layer is positioned between the magnetic head and the soft magnetic layer during the recording of information. Accordingly, the magnetic path is formed between the magnetic head and the soft magnetic layer during the recording of information. Therefore, it is possible to reliably apply the magnetic field from the magnetic head to the recording layer. The soft magnetic layer also makes it possible to control the crystalline orientation of the recording layer. It is possible to use, for example, Fe, Fe—Si alloy, and Ni—Fe alloy for the soft magnetic layer as described above.

The magnetic recording medium of the present invention may comprise a non-magnetic layer between the soft magnetic layer and the recording layer. The non-magnetic layer makes it possible to break the magnetic coupling effected between the soft magnetic layer and the recording layer. It is preferable to use Cr, Pt, Pd, Au, Fe, Ni, MgO, or NiO as the material for forming the non-magnetic layer. It is especially preferable to use MgO which has a strong effect to avoid the diffusion of the material caused between the soft magnetic layer and the recording layer.

As for the magnetic recording medium of the present invention, it is preferable that the orientation control layer, the soft magnetic layer, the non-magnetic layer, and the recording layer are formed in this order on the substrate.

According to a second aspect of the present invention, there is provided a magnetic recording apparatus comprising:

the magnetic recording medium according to the first aspect;

a magnetic head which records or reproduces information on the magnetic recording medium; and a drive unit which drives the magnetic recording medium with respect to the magnetic head.

The magnetic recording apparatus of the present invention makes it possible to perform the recording in a large capacity, and magnetic recording apparatus is excellent in recording stability over a long period of time, because the magnetic recording apparatus is provided with the magnetic recording medium according to the first aspect of the present invention.

According to a third aspect of the present invention, there is provided a method for producing the magnetic recording medium according to the first aspect, the method comprising forming the recording layer by means of a sputtering method. According to the production method as described above, it is possible to produce the magnetic recording medium according to the first aspect of the present invention. Those usable as the sputtering method are arbitrary sputtering methods including, for example, the ECR sputtering method, the DC magnetron sputtering method, and the RF magnetron sputtering method.

When the recording layer, which contains the FePt ordered alloy and the FePt$_3$ ordered alloy, is formed in accordance with the production method of the present invention, it is preferable to form the film so that the concentration of Pt in the recording layer is within a range of 55 to 65 atomic %. As shown in a phase diagram of the Fe—Pt two-component alloy in FIG. 1, the ordered alloys of FePt and FePt$_3$ appear in a temperature region of not more than about 1300° C. The region X, which is hatched in FIG. 1, is a composition range in which the mixed phase of the two phases, i.e., the FePt ordered alloy phase and the FePt$_3$ ordered alloy phase appears. As appreciated from FIG. 1, the FePt$_3$ ordered alloy has an ordering temperature which is higher than that of the FePt ordered alloy. Therefore, it is appreciated that the FePt$_3$ ordered alloy is also ordered at a temperature at which the FePt ordered alloy is ordered. Therefore, it is possible to obtain the recording layer containing the FePt ordered alloy and the FePt$_3$ ordered alloy by forming the film while controlling, for example, the material of the sputtering target and the electric power application to the sputtering target so that the composition of Fe and Pt is within the range as described above.

In the production method of the present invention, when the recording layer, which includes the FePt ordered alloy and the FePt$_3$ ordered alloy, is formed, it is preferable that the substrate is heated to 300° C. to 350° C., desirably 350° C. to 400° C., and the recording layer is formed on the heated substrate. Accordingly, it is possible to facilitate the ordering of the FePt ordered alloy and the FePt$_3$ ordered alloy for constructing the recording layer, and it is possible to facilitate the phase separation thereof.

Alternatively, it is also preferable that the recording layer is formed on the substrate without heating the substrate, and then the substrate, on which the recording layer has been formed, is heated to 300° C. to 350° C., desirably 350° C. to 400° C. When the substrate is heated at the temperature as described above after forming the film of the recording layer, it is possible to allow the FePt ordered alloy and the FePt$_3$ ordered alloy to cause the two-phase separation even when any FePt random alloy is formed on the substrate immediately after the formation of the film of the recording layer.

The recording layer, which has the two-phase separation structure obtained by the method as described above, includes the paramagnetic FePt$_3$ ordered alloy which makes it possible to break the magnetic interaction between the crystal grains of the FePt ordered alloy as described above. Therefore, it is possible to reduce the noise by using the magnetic recording medium having the recording layer as described above. The oxide of MgO or the like and the granular film of FePt also make it possible to reduce the magnetic interaction between the FePt crystal grains. However, the ordering temperature is increased in some cases, and the orientation is degraded in other cases. In general, the glass substrate, which is used as the substrate for the magnetic recording medium, cannot endure the heating at a temperature of not less than 600° C. Therefore, it is impossible to heat the glass substrate to a temperature of not less than 600° C. during the process for producing the magnetic recording medium. In the production method of the present invention, the ordered alloy having the two-phase separation structure can be formed on the substrate by heating the substrate to 300° C. to 350° C., desirably 350° C. to 400° C. without increasing the ordering temperature. Therefore, it is possible to use the glass substrate. The production method of the present invention is extremely excellent also in view of the process for manufacturing the magnetic recording medium.

DESCRIPTION OF THE PREFERRED EMBODIMENT

The magnetic recording medium and the magnetic recording apparatus of the present invention will be explained more specifically below with reference to Examples. However, the present invention is not limited to Examples.

EXAMPLE 1

Figure 1:
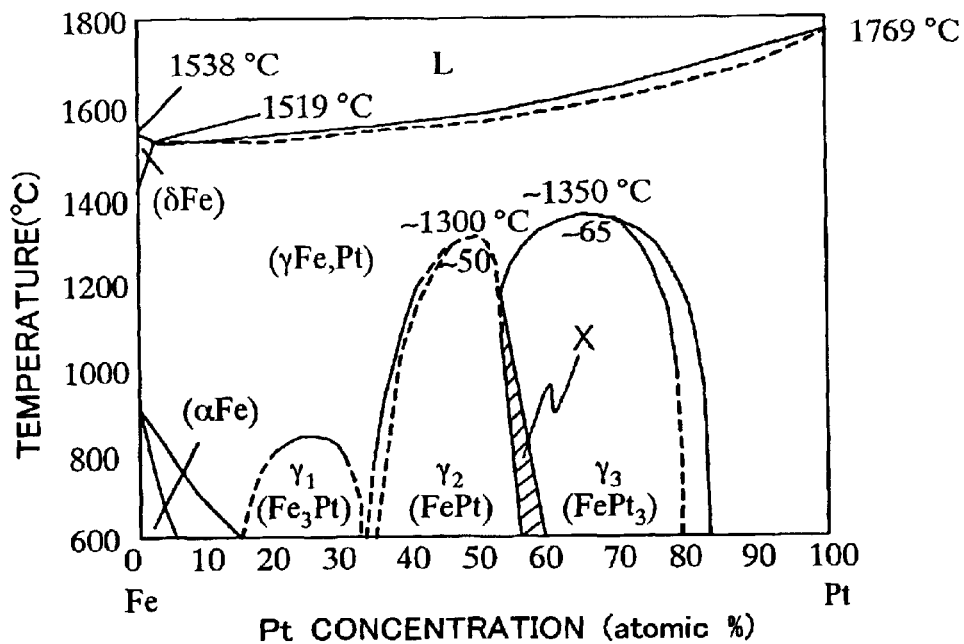
FIG. 1 shows a phase diagram of the Fe—Pt two-component alloy with respect to the Pt concentration.
Figure 2:
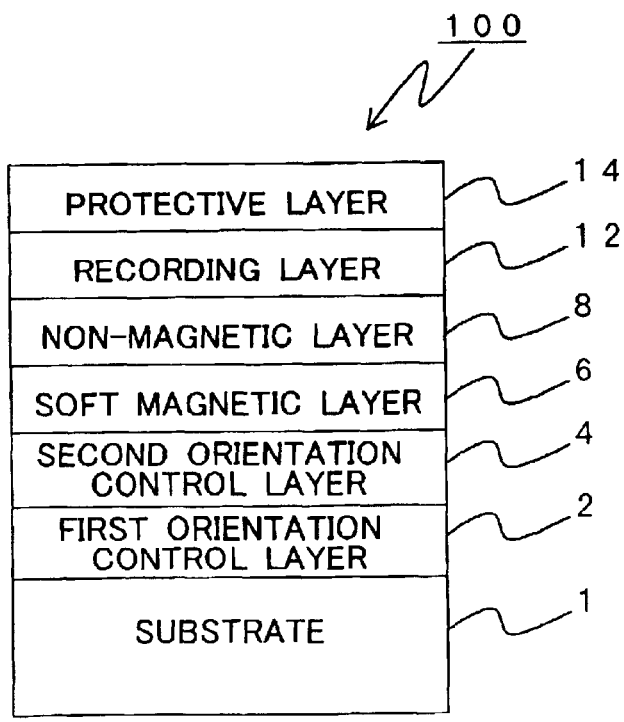
FIG. 2 shows a schematic sectional view illustrating a magnetic recording medium manufactured in Example 1.

FIG. 2 shows a sectional view illustrating a typical example of the magnetic recording medium according to the present invention. The magnetic recording medium 100 comprises, on a glass substrate 1, a first orientation control layer 2, a second orientation control layer 4, a soft magnetic layer 6, a non-magnetic layer (magnetostatic interaction-separating layer) 8, a recording layer 12, and a protective layer 14. The respective layers ranging from the first orientation control layer 2 to the protective layer 14 formed on the substrate 1 were formed by means of the sputtering by using a DC magnetron sputtering apparatus or an RF magnetron sputtering apparatus. A method for producing the magnetic recording medium 100 will be explained below.

At first, a glass substrate 1 having a diameter of 2.5 inches (6.25 cm) was prepared, and an MgO film was formed as the first orientation control layer 2 on the substrate 1 by using the RF magnetron sputtering method. The MgO film had a film thickness of 20 nm.

Subsequently, a Cr film was formed as the second orientation control layer 4 to have a film thickness of 50 nm on the first orientation control layer 2 by using the DC magnetron sputtering method. Subsequently, Fe—Si was formed as the soft magnetic layer 6 to have a film thickness of 400 nm on the second orientation control layer 4 by using the DC magnetron sputtering method. Subsequently, an MgO film was formed as the non-magnetic layer 8 to have a film thickness of 1 nm on the soft magnetic layer 6 by using the RF magnetron sputtering method.

Subsequently, an FePt film was formed as the recording layer 12 to have a film thickness of 15 nm on the non-magnetic layer 8. The FePt film was formed as a film by means of the DC co-sputtering method by using an Fe target and a Pt target as targets. During the sputtering, the Ar gas pressure was 0.3 Pa, the electric power applied to the Fe target was 0.5 kW, and the electric power applied to the Pt target was 0.7 kW. In Example 1, the temperature of the substrate was changed by every 50° C. within a range of 200 to 500° C. before forming the film of the recording layer so that recording layers were formed at various substrate temperatures to manufacture a plurality of magnetic recording media. The compositions of the recording layers formed at the various substrate temperatures were investigated by using the X-ray photoelectron spectroscopy. As a result, the composition ratio between Fe and Pt was 42:58 in each of the recording layers.

Finally, carbon was formed as the protective film 14 to have a film thickness of 5 nm on the recording layer 12 by using the DC magnetron sputtering method. The film formation condition was equivalent to that adopted for the second orientation control layer 4. Thus, the magnetic recording media 100 each having the structure shown in FIG. 2 were produced.

COMPARATIVE EXAMPLE 1

In Comparative Example 1, a plurality of magnetic recording media were produced by changing the substrate temperature during the formation of the recording layer in the same manner as in Example 1 except that the films were formed so that the composition ratio of Fe—Pt in the recording layer 12 was 50:50. The film thickness of each of the recording layers was 15 nm in the same manner as in Example 1.

Evaluation of Structure

The structures of the magnetic recording media manufactured in Example 1 and Comparative Example 1 were analyzed by means of the X-ray diffraction method. In all of the magnetic recording media of Example 1 and Comparative Example 1, MgO as the first orientation control layer 2 was subjected to the (001) orientation, and Cr as the second orientation control layer 4 was subjected to the (001) orientation. Only a peak resulting from the (002) plane of the FePt random alloy was observed from the recording layer of each of the magnetic recording media in which the recording layer was formed at the substrate temperature less than 300° C., of the plurality of magnetic recording media manufactured in Example 1. On the other hand, in the case of the magnetic recording media in each of which the recording layer was formed at the substrate temperature not less than 300° C., a peak based on the superlattice line resulting from the (001) plane brought about by the ordering was observed together with peaks resulting from the (002) plane as basic peaks of the FePt ordered alloy and the $FePt_3$ ordered alloy respectively. According to this fact, it is appreciated that the FePt ordered alloy and the $FePt_3$ ordered alloy appear as a result of the advance of the phase separation and the ordering of the FePt alloy in the recording layer. According to the fact that only the (002) primitive lattice line and the (001) superlattice line were observed as the peaks resulting from FePt in the recording layer, it is appreciated that the orientation of the recording layer is controlled, and the [001] direction as the easy axis of magnetization of FePt is directed in the direction perpendicular to the film surface.

On the other hand, the ordering of the FePt alloy in the recording layer was advanced, and a peak resulting from the FePt ordered alloy was observed in each of the magnetic recording media in which the recording layer was formed at the substrate temperature of not less than 300° C. in the same manner as in the magnetic recording media of Example 1, of the plurality of magnetic recording media manufactured in Comparative Example 1. Also in this case, only peaks of the (002) primitive lattice line and the (001) superlattice line were observed in the same manner as in Example 1. Therefore, it is appreciated that the orientation of the recording layer is controlled. However, unlike the magnetic recording media of Example 1, any peak resulting from the $FePt_3$ ordered alloy was not observed. According to this fact, it is appreciated that the FePt alloy in the recording layer does not cause the phase separation, and only the order-disorder transformation occurs from the FePt random phase to the FePt ordered phase, which results in the FePt single phase.

The rocking curve for (001) was measured to determine the half value width for the magnetic recording media in each of which the (001) peak of the FePt ordered alloy was observed, of the magnetic recording media of Example 1 and Comparative Example 1. As a result, the magnetic recording media of Example 1 had 4.3°, and the magnetic recording media of Comparative Example 1 had 4.2°, in which little difference was observed.

The results described above indicate the following fact. That is, the temperature (ordering temperature), at which the FePt ordered alloy is obtained, greatly affects, for example, the film formation condition and the substrate temperature. When the substrate temperature during the formation of the recording layer is set to be 300° C. to 350° C., preferably 350° C. to 400° C., it is possible to form the recording layer having the two-phase separation structure of the FePt ordered alloy phase and the $FePt_3$ ordered alloy phase without affecting the ordering temperature and the crystalline orientation. When the condition to form the recording layer is optimized, then the FePt ordered alloy is ordered even at 300° C., the ordering is started at a temperature of not less than 350° C. in almost all cases, and the ordering can be effected completely at a temperature of not less than 400° C.

Evaluation of Magnetic Characteristics

The magnetization in the direction perpendicular to the film surface was measured for the magnetic recording media of Example 1 and Comparative Example 1 in each of which the recording layer was formed at the substrate temperature of 300° C. to determine the magnetization curve. In the case of the magnetic recording media of Example 1, the magnetization curve of the parallelogram type was obtained. This result indicates that the magnetization reversal is advanced by the rotating magnetization. The rectangularity ratio was 1, the coercivity was 6.5 kOe, and Ms was 800 emu/cc. Assuming that a represents the value obtained by normalizing the slope of the magnetization curve in the direction perpendicular to the film surface with $4\pi$, $\alpha=1.5$ was obtained in the case of Example 1. The value $\alpha$ is called "loop slope parameter", which indicates the interaction between the crystal grains as often used for the perpendicular magnetic recording medium. The expression of $\alpha=1$ means the fact that there is no interaction between the crystal grains. The result of Example 1 means the fact that the magnetic separation is advanced, and the magnetization reversal is principally advanced by the rotating magnetization. As clarified from the X-ray diffraction measurement described above, the recording layer of each of the magnetic recording media of Example 1 has the two-phase separation structure in which the two phases of the FePt ordered alloy phase and the $FePt_3$ ordered alloy phase are separated from each other. The $FePt_3$ ordered alloy exhibits the paramagnetism at the normal temperature. Therefore, the magnetic interaction between the grains composed of the FePt ordered alloy is broken off. Accordingly, the magnetization reversal becomes the rotating magnetization.

On the other hand, the type of the magnetization curve of each the magnetic recording media of Comparative Example 1 was different from that of the magnetic recording medium of Example 1. Further, the rectangularity ratio was 1, the coercivity was 5.5 kOe, and Ms was 1050 emu/cc. In the case of the magnetic recording media of Comparative Example 1, $\alpha=15$ was obtained. The increase in $\alpha$ indicates the fact that the magnetization reversal is advanced by the domain wall nucleation and propagation. The recording layer of each of the magnetic recording media of Comparative Example 1 is formed of only the FePt alloy. Therefore, the individual crystal grains in the recording layer are coupled to one another magnetically strongly. For this reason, it is considered that the process of magnetization reversal is advanced by the domain wall nucleation and propagation. According to the fact as described above, the difference in structure of the recording layer is expressed as the difference in magnetization reversal between the both. Further, the value of Ms is low as well, because the ratio of FePt in the recording layer differs, and the ratio is small in Example 1.

EXAMPLE 2

Figure 3:
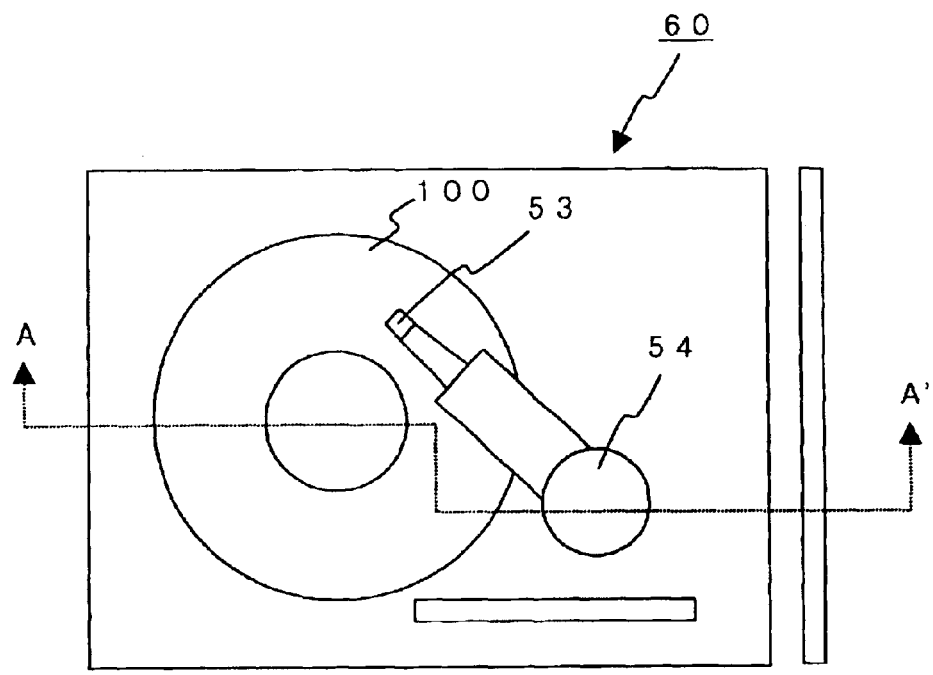
FIG. 3 shows a schematic view as viewed from a position over an exemplary magnetic recording apparatus according to Example 2 of the present invention.
Figure 4:
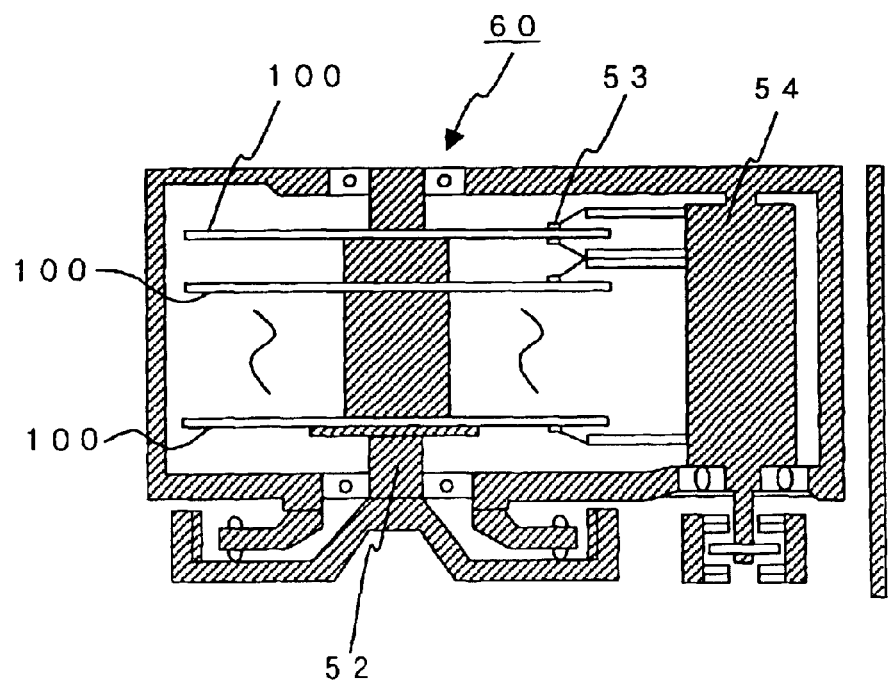
FIG. 4 shows a sectional view taken in a direction of A—A', illustrating the magnetic recording apparatus shown in FIG. 3.

A plurality of magnetic recording media were manufactured in accordance with the same process as that used in Example 1, and a lubricant was applied to protective layers of the respective magnetic recording media. After that, the magnetic recording media were coaxially attached to a spindle of a magnetic recording apparatus. A schematic arrangement of the magnetic recording apparatus is shown in FIGS. 3 and 4. FIG. 3 shows a top view illustrating the magnetic recording apparatus. FIG. 4 shows a sectional view illustrating the magnetic recording apparatus 60 taken along a broken line A—A' shown in FIG. 3. A thin film single magnetic pole head was used as a recording magnetic head. The recording magnetic head and a reproducing magnetic head are integrated into one unit which is shown as a magnetic head 53 in FIGS. 3 and 4. The integrated type magnetic head 53 is controlled by a magnetic head-driving system 54. The plurality of magnetic recording media 100 are coaxially rotated by the spindle 52 of a rotary driving system. The distance between the magnetic head surface of the magnetic recording apparatus and the magnetic recording medium was maintained to be 11 nm. A signal corresponding to 50 Gbits/inch$^2$ was recorded on the magnetic recording media to evaluate S/N of the magnetic recording media. As a result, a reproduction output of 25 dB was obtained.

COMPARATIVE EXAMPLE 2

A plurality of magnetic recording media were manufactured in accordance with the same process as that used in Comparative Example 1, and they were incorporated into a magnetic recording apparatus in the same manner as in Example 2. A signal corresponding to 50 Gbits/inch$^2$ was recorded on the magnetic recording media to evaluate S/N of the magnetic recording media. As a result, a reproduction output of 20 dB was obtained. That is, the magnetic recording media of Example 2 were better than the magnetic recording media of Comparative Example 2 by 5 dB of the reproduction output. Therefore, it is appreciated that the magnetic recording apparatus, which is provided with the magnetic recording media of the present invention, makes it possible to reproduce the information recorded at the high density, at the high reproduction output. Further, the magnetic recording media of Example 1 successfully retain the information recorded in the recording layer stably for a long period of time. It has been revealed that the magnetic recording media of Example 1 are excellent in thermal stability.

The magnetic recording medium according to the present invention has been specifically explained above in accordance with Examples. However, the present invention is not limited thereto. Those usable for the first and second orientation control layers, the soft magnetic layer, the nonmagnetic layer, and the recording layer are not limited to the materials described in Examples. The first and second orientation control layers, the soft magnetic layer, the nonmagnetic layer, and the recording layer may be constructed by using a variety of known materials.

In Examples described above, the recording layer is formed of the FePt ordered alloy and the $FePt_3$ ordered alloy. However, a third element other than Fe and Pt may be also contained. Further, for example, when an FePd ordered alloy and/or a CoPt ordered alloy other than the FePt ordered alloy is used, it is also possible to obtain a two-phase separation structure of the FePd ordered alloy and the $FePt_3$ ordered alloy and/or a two-phase separation structure of the CoPt ordered alloy and the $FePt_3$ ordered alloy.

In the magnetic recording medium of the present invention, for example, the magnetic interaction, which is effected between the crystal grains formed of the $L1_0$ ordered alloy having the high crystalline magnetic anisotropy, can be reduced by the $FePt_3$ ordered alloy which is contained in the recording layer and which exhibits the paramagnetism. Therefore, it is possible to reduce the noise. Further, the $L1_0$ ordered alloy, which has the high crystalline magnetic anisotropy, can be used for the recording layer. Therefore, the magnetic recording medium of the present invention is excellent in thermal stability, and it is possible to perform the high density recording thereon.

The magnetic recording apparatus of the present invention is provided with the magnetic recording medium of the present invention. Therefore, the magnetic recording apparatus of the present invention is excellent in thermal stability, and the magnetic recording apparatus of the present invention makes it possible to realize the recording at the high recording density exceeding, for example, 50 Gbits/inch$^2$.

According to the production method of the present invention, it is possible to produce the magnetic recording medium comprising the recording layer including, for example, the $L1_0$ ordered alloy and the $FePt_3$ ordered alloy, without raising the substrate temperature. Therefore, it is possible to use the substrate such as the glass substrate having low heat resistance. According to the production method of the present invention, it is possible to produce the magnetic recording medium of the present invention.

What is claimed is:

1. A magnetic recording medium comprising:
    a substrate; and
    a recording layer which is formed over the substrate, wherein:
    the recording layer includes an FePt ordered alloy which constitutes crystal grains and an $FePt_3$ ordered alloy which constitutes crystal train boundary.

2. The magnetic recording medium according to claim 1, wherein a content of the $FePt_3$ ordered alloy in the recording layer is within a range of 15 atomic % to 60 atomic %.

3. The magnetic recording medium according to claim 1, wherein a plane of crystal lattice planes of the recording layer, which corresponds to a Miller index (001), is parallel to a substrate surface.

4. The magnetic recording medium according to claim 1, further comprising a soft magnetic layer and a non-magnetic layer between the substrate and the recording layer, wherein the non-magnetic layer is formed between the soft magnetic layer and the recording layer.

5. The magnetic recording medium according to claim 4, wherein the soft magnetic layer is formed of one selected from the group consisting of Fe, Fe—Si alloy, and Ni—Fe alloy.

6. The magnetic recording medium according to claim 4, wherein the non-magnetic layer is formed of MgO.

7. The magnetic recording medium according to claim 4, further comprising an orientation control layer formed of a non-magnetic material disposed between the substrate and the soft magnetic layer.

8. The magnetic recording medium according to claim 7, wherein the orientation control layer is formed of one selected from the group consisting of Cr, Pt, Pd, Au, Fe, Ni, MgO, and NiO.

9. A magnetic recording apparatus comprising:
    the magnetic recording medium as defined in claim 1;
    a magnetic head which records or reproduces information on the magnetic recording medium; and
    a drive unit which drives the magnetic recording medium with respect to the magnetic head.

10. A method for producing the magnetic recording medium as defined in claim 1, comprising forming the recording layer by a sputtering method.

11. The method for producing the magnetic recording medium according to claim 10, further comprising preparing the substrate, heating the substrate to a predetermined temperature, and forming the recording layer on the heated substrate.

12. The method for producing the magnetic recording medium according to claim 11, wherein the substrate is heated to a temperature of not less than 300° C.

13. The method for producing the magnetic recording medium according to claim 10, further comprising preparing the substrate, forming the recording layer on the substrate, and then heating the substrate to a predetermined temperature.

14. The method for producing the magnetic recording medium according to claim 10, wherein the recording layer is formed so that a concentration of Pt in the recording layer is within a range of 55 atomic % to 65 atomic %.

15. The method for producing the magnetic recording medium according to claim 10, wherein the substrate is a glass substrate.

16. The magnetic recording medium according to claim 4, further comprising a plurality of orientation control layers disposed between the substrate and the soft magnetic layer.

17. The magnetic recording medium according to claim 16, wherein the plurality of orientation control layers is formed of one selected from the group consisting of Cr, Pt, Pd, Au, Fe, Ni, MgO and NiO.

* * * * *